(12) United States Patent
Ros et al.

(10) Patent No.: US 11,106,468 B2
(45) Date of Patent: Aug. 31, 2021

(54) SYSTEM AND METHOD FOR NON-SPECULATIVE REORDERING OF LOAD ACCESSES

(71) Applicant: ETA SCALE AB, Uppsala (SE)

(72) Inventors: Alberto Ros, Cartagena (ES); Stefanos Kaxiras, Uppsala (SE)

(73) Assignee: ETA SCALE AB, Uppsala (SE)

( * ) Notice: Subject to any disclaimer, the term of this patent is extended or adjusted under 35 U.S.C. 154(b) by 207 days.

(21) Appl. No.: 15/987,186

(22) Filed: May 23, 2018

(65) Prior Publication Data

US 2018/0373541 A1 Dec. 27, 2018

Related U.S. Application Data

(60) Provisional application No. 62/509,930, filed on May 23, 2017.

(51) Int. Cl.
| | | |
|---|---|---|
| *G06F 9/30* | (2018.01) | |
| *G06F 9/38* | (2018.01) | |
| *G06F 9/52* | (2006.01) | |
| *G06F 12/084* | (2016.01) | |
| *G06F 12/0817* | (2016.01) | |
| *G06F 9/54* | (2006.01) | |

(52) U.S. Cl.
CPC ........ *G06F 9/3855* (2013.01); *G06F 9/30043* (2013.01); *G06F 9/52* (2013.01); *G06F 9/544* (2013.01); *G06F 12/084* (2013.01); *G06F 12/0828* (2013.01)

(58) Field of Classification Search
None
See application file for complete search history.

(56) References Cited

U.S. PATENT DOCUMENTS

| | | | | |
|---|---|---|---|---|
| 2015/0277975 | A1* | 10/2015 | Keim | G06F 9/30043 711/146 |
| 2016/0092223 | A1* | 3/2016 | Wang | G06F 9/30145 712/208 |
| 2016/0092359 | A1* | 3/2016 | Busaba | G06F 12/0817 711/141 |

OTHER PUBLICATIONS

Afram et al., "A Group-Commit Mechanism for ROB-Based Processors Implementing the X86 ISA," 19th International Symposium on High Performance Computer Architecture (HPCA 2013), Feb. 23-27, 2013, Shenzhen, CN.
Agarwal et al., "GARNET: A Detailed On-Chip Network Model inside a Full-System Simulator," IEEE International Symposium on Performance Analysis of Systems and Software, ISPASS 2009, Apr. 26-28, 2009, Boston, MA, US.
Alipour et al., "Exploring the Performance Limits of Out-of-order Commit," Proceedings of the Frontiers Conference, May 15-17, 2017, Siena, IT.
Balkind et al., "OpenPiton: An Open Source Manycore Research Framework," ASPLOS '16, Apr. 2-6, 2016, Atlanta, GA, US.
Bell et al., "Deconstructing Commit," IEEE International Symposium on Performance Analysis of Systems and Software (ISPASS), Sep. 27, 2004, Austin, TX, US.

(Continued)

*Primary Examiner* — Corey S Faherty
(74) *Attorney, Agent, or Firm* — Patent Portfolio Builders PLLC

(57) ABSTRACT

Methods and systems for maintaining validity of a memory model in a multiple core computer system are described. A first core prevents a store instruction from being performed by another core until a condition is met which enables reordered instructions to validly execute.

14 Claims, 8 Drawing Sheets

(56) References Cited

OTHER PUBLICATIONS

Bienia et al., "The PARSEC Benchmark Suite: Characterization and Architectural Implications," PACT '08, Oct. 25-29, 2008, Toronto, ON, CA.
Blundell et al., "INVISIFENCE: Performance-Transparent Memory Ordering in Conventional Multiprocessors," ISCA 09, Jun. 20-24, 2009, Austin, TX, US.
Cain et al., "Memory Ordering: A Value-Based Approach," Proceedings of the 31st Annual International Symposium on Computer Architecture, ISCA '04, Jun. 19-23, 2004, München, DE.
Carlson et al., "An Evaluation of High-Level Mechanistic Core Models," ACM Transactions on Architecture and Code Optimization, vol. 11, No. 3, Article 28, Jul. 2014.
Ceze et al., "BulkSC: Bulk Enforcement of Sequential Consistency," ISCA '07, Jun. 9-13, 2007, San Diego, CA, US.
Chaudhry et al., "Rock: A High-Performance Sparc CMT Processor," IEEE Micro, Mar./Apr. 2009, pp. 6-16.
Cristal et al., "Out-of-Order Commit Processors," Proceedings of the 10th International Symposium on High Performance Computer Architecture, HPCA '04, Feb. 14-18, 2004, Madrid, ES.
Cristal et al., Toward Kilo-instruction Processors, ACM Transactions on Architecture and Code Optimization, vol. 1, No. 4, Dec. 2004, pp. 368-396.
Duan et al., "SCsafe: Logging Sequential Consistency Violations Continuously and Precisely," 2016 International Symposium on High Performance Computer Architecture (HPCA), Mar. 12-16, 2016, Barcelona, ES.
Duong et al., "Compiler-Assisted, Selective Out-Of-Order Commit," IEEE Computer Architecture Letters, vol. 12, No. 1, Jan.-Jun. 2013.
Elver et al., "TSO-CC: Consistency directed cache coherence for TSO," IEEE 20th International Symposium on High Performance Computer Architecture (HPCA), Feb. 15-19, 2014, Orlando, FL, US.
Fernández-Pascual et al., "To be silent or not: on the impact of evictions of clean data in cache-coherent multicores," The Journal of Supercomputing, vol. 73, No. 10, Oct. 2017, pp. 4428-4443.
Gharachorloo et al., "Two Techniques to Enhance the Performance of Memory Consistency Models," Proceedings of the 1991 International Conference on Parallel Processing, Aug. 1991.
Gope et al., "Atomic SC for Simple In-order Processors," IEEE 20th International Symposium on High Performance Computer Architecture (HPCA), Feb. 15-19, 2014, Orlando, FL, US.
Gwennap, "Digital Leads the Pack with 21164," Microprocessor Report, vol. 8, No. 12, Sep. 12, 1994.
Ham et al., "DeSC: Decoupled Supply-Compute Communication Management for Heterogeneous Architectures," MICRO-48, Dec. 5-9, 2015, Waikiki, HI, US.
Hilton et al., "BOLT: Energy-Efficient Out-of-Order Latency-Tolerant Execution," HPCA-16 2010, The Sixteenth International Symposium on High Performance Computer Architecture, Jan. 9-14, 2010, Bangalore, IN.
Lebeck et al., "Dynamic Self-Invalidation: Reducing Coherence Overhead in Shared-Memory Multiprocessors," Proceedings of the 22nd Annual International Symposium on Computer Architecture, Jun. 22-24, 1995, Santa Margherita, IT.
Lin, et al., "Efficient Sequential Consistency via Conflict Ordering," ASPLOS '12, Mar. 3-7, 2012, London, UK.
Martin et al., "Mulitfacet's General Execution-driven Multiprocessor Simulator (GEMS) Toolset," Computer Architecture News, Sep. 2005.
Martínez et al., "Cherry: Checkpointed Early Resource Recycling in Out-of-order Microprocessors," 35th Annual International Symposium on Microarchitecture (MICRO-35), Nov. 2002.
Park et a;., "Reducing Design Complexity of the Load/Store Queue," Proceedings of the 36th International Symposium on Microarchitecture (MICRO-36'03), Dec. 3-5, 2003.
Petit et al., "A Complexity-Effective Out-of-Order Retirement Microarchitecture," IEEE Transactions on Computers, vol. 58, No. 12, Dec. 2009.
Ranganathan et al., "Using Speculative Retirement and Larger Instruction Windows to Narrow the Performance Gap between Memory Consistency Models," Proceedings of the 9th Annual Symposium on Parallel Algorithms and Architectures, Jun. 23-25, 1997, Newport, RI.
Ros et al., "Racer: TSO Consistency via Race Detection," 49th Annual IEEE/ACM International Symposium on Mircoarchitecture (MICRO), Oct. 15-19, 2016, Taipei, TW.
Roth, "Store Vulnerability Window (SVW): Re-Execution Filtering for Enhanced Load Optimization," 32nd International Symposium on Computer Architecture (ISCA '05), Jul. 4-8, 2005, Madison, WI, US.
Sakalis et al., "Splash-3: A Properly Synchronized Benchmark Suite for Contemporary Research," IEEE International Symposium on Performance Analysis of Systems and Software (ISPASS), Apr. 17-19, 2016, Uppsala, SE.
Sewell et al., "x86-TSO: A Rigorous and Usable Programmer's Model for x86 Multiprocessors," Communications of the ACM, vol. 53, No. 7, Jul. 2010.
Singhal et al., "Gigaplane™: A High Performance Bus for Large SMPs," Hot Interconnects IV, Jul. 16, 1996, pp. 41-52.
Sorin et al., "A Primer on Memory Consistency and Cache Coherence," Synthesis Lectures on Computer Architecture, 2011, Morgan & Claypool Publishers.
SPARC International Inc., "The SPARC Architecture Manual," Version 8, 1992.
Ubal et al., "The Impact of Out-of-Order Commit in Coarse-Grain, Fine-Grain and Simultaneous Multithreaded Architectures," 22nd IEEE International Symposium on Parallel and Distributed Processing, IPDPS 2008, Apr. 14-18, 2008, Miami, FL.
Ubal et al., "VB-MT: Design Issues and Performance of the Validation Buffer Microarchitecture for Multithreaded Processors," International Conference on Parallel Architecture and Compilation Techniques, PACT 2007, Sep. 15-19, 2007, Brasov, RU.
Vantrease et al., "Atomic Coherence: Leveraging Nanophotonics to Build Race-Free Cache Coherence Protocols," 17th International Symposium on High Performance Computer Architecture (HPCA), Feb. 12-16, 2011, San Antonio, TX.
Yu et al., "Tardis 2.0: Optimized Time Traveling Coherence for Relaxed Consistency Models," PACT '16, Sep. 11-15, 2016, Haifa, IL.

* cited by examiner

Preventing, by a first core, a store in a store buffer of another core from being performed in a memory system, until a condition is met which enables reordered instructions to validly execute. ~700

FIG. 7

SYSTEM AND METHOD FOR NON-SPECULATIVE REORDERING OF LOAD ACCESSES

RELATED APPLICATION

The present application is related to, and claims priority from U.S. Provisional Patent Application No. 62/509,930, filed May 23, 2017, entitled "Non-Speculative Load-Load Reordering in TSO", to Stefanos Kaxiras and Alberto Ros, the disclosure of which is incorporated herein by reference.

TECHNICAL FIELD

Embodiments described herein relate in general to memory system ordering and coherence in multiprocessor systems and, more particularly, to the reordering of accesses under various memory consistency models.

BACKGROUND

In memory consistency models that preserve the program order of loads, loads can be speculatively reordered to improve performance. Conventionally, if a load reordering is seen by other cores, speculative loads must be squashed and re-executed. In architectures with an unordered interconnection network and directory coherence, this has been the only solution that does not violate the memory consistency model.

To maximize performance, processors execute instructions out-of-order and can speculatively transgress the ordering rules of a memory consistency model. Conventionally, if such transgressions are observed, processors squash incorrect execution and return to a prior checkpointed state that does not violate the desired consistency model.

Consider, for example, the Total Store Order (TSO) memory model, which requires a replay (re-execution) of speculative loads that violate their load→load program order when a reordering is detected by other cores. Load-load reordering can occur, for example, when an older load has an unresolved address or if it misses in the cache while a younger load hits (i.e., a hit-under-miss). The younger load is speculative until the older load completes. A coherence event such as invalidation for the address of the speculative load means that the reordering has been detected by a core racing with the load in question. In this case, the speculative load and all its dependent instructions, which followed it in execution, are squashed and must be reissued for execution. This squashing and re-execution of instructions consumes bandwidth and energy.

Accordingly, it would be desirable to provide systems and methods wherein a coherence event does not require squashing of the speculative load and its dependent instructions and the reissuing of such instructions for execution.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a flowchart illustrating a method according to an embodiment.

SUMMARY

Figure 1:
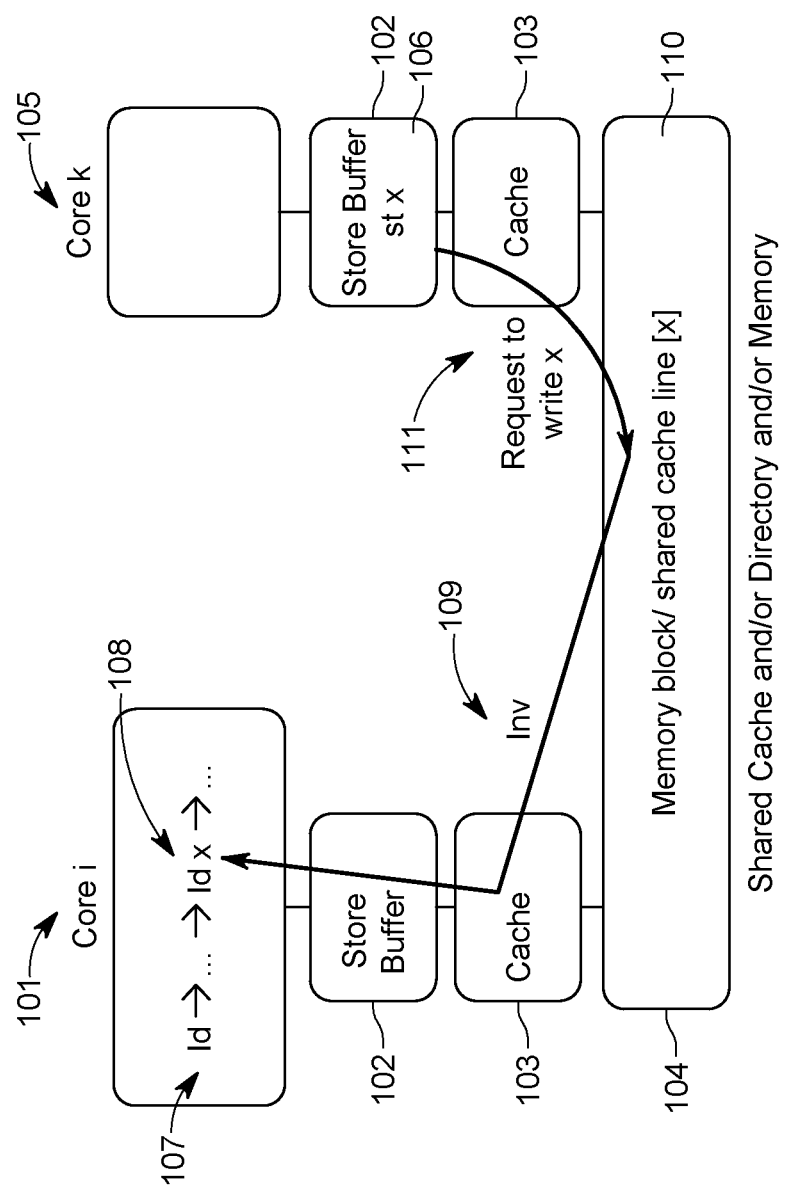
FIG. 1 depicts a block diagram of a computer system according to an embodiment.

The embodiments described herein, among other things, address the weaknesses of conventional memory systems which require squashing and re-execution of certain instructions under various conditions in order to maintain memory model consistency.

According to an embodiment, a computer system includes multiple processor cores, a store buffer associated with and operatively coupled to each core for placing store instructions when they are committed and before they are performed in the memory system; at least one local cache memory associated with and operatively coupled to each core for storing one or more cache lines accessible only by the associated core; a shared memory, the shared memory being operatively coupled to the local cache memories and accessible by the cores, the shared memory being capable of storing a plurality of cache lines or memory blocks; and a coherence mechanism to keep processor core and shared memory coherent; wherein a core prevents a store in the store buffer of another core from being performed in the memory system, until a condition is met which enables reordered instructions to validly execute.

According to another embodiment, A method for maintaining validity of a memory model in a multiple core computer system, includes the step of preventing, by a first core, a store in a store buffer of another core from being performed in a memory system, until a condition is met which enables reordered instructions to validly execute.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore cache coherence protocols. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The disclosed system and method shows that to preserve TSO or other weaker memory models, it is not necessary to squash a reordered younger load upon receiving an invalidation that matches its address. Instead the disclosed system and method does not return an acknowledgment until the time that the older load is performed. Stated differently, in these embodiments it is not necessary to squash and re-execute speculatively reordered loads when their reordering is seen. Instead, the reordering is hidden form other cores by the coherence protocol. The disclosed system and method exposes a load reordering to the coherence layer and successfully hides such reordering without perceptible performance cost and without deadlock.

The embodiments described herein thus disclose systems and methods which provide non-speculative load-load reordering for a general unordered network and directory coherence; it provides irrevocable binding of reordered loads to values, even when the reordering is over other loads with unresolved addresses; guarantees that TSO and weaker memory models are preserved.

As mentioned in the Background, a memory consistency model is violated when a reordering that is not allowed by the consistency model (e.g. reordering of loads) is observed by some other conflicting memory access (i.e., a store on the same memory block as one of the reordered loads) and cannot be undone. In the embodiments described below when a memory operation such as a store is about to detect a load reordering that potentially violates the memory model, the coherence layer covers up the impending violation by delaying the conflicting memory operation (the store), until the potentially illegal reordering of the loads disappears without being observed.

The embodiments apply to the Total Store Order (TSO) memory consistency model, but could also be used with other memory models. In TSO when a conflicting store from one core observes a load-load reordering in another core, the reordering potentially violates the memory model. In the disclosed system and method the core which reorders the loads, and whose reordering may be detected by the conflicting store of another core, uses the coherence protocol to delay the conflicting store in its store buffer until the load reordering cannot be seen any longer.

The disclosed system and method modifies the transactions of a directory protocol to handle these detection events without penalizing the performance in the common case. The disclosed system and method requires negligible additional state in the cores and does not add to the cost of coherence in the caches or the directory. The disclosed system and method is deadlock-free and livelock-free and yields higher performance for out-of-order commit or higher efficiency for in-order commit processors by not having to squash and re-execute.

Note that FIG. 1 is described toward the end of the text after the discussion of FIGS. 2A-6. Prior to discussing these embodiments in more detail with respect to FIGS. 2A and 2B, some terminology is first described. Loads and stores are instructions (that issue, execute and commit) while reads and writes are transactions of the coherency protocol. They differ in granularity (loads and stores operate on bytes, words, etc., while reads and writes operate on cachelines) but more importantly they differ on how we consider them to be performed. A load is performed when it receives data; prior to that, the load is non-performed. A load is ordered with respect to loads in its core when all prior (older) loads in program order are performed; otherwise the load is unordered.

An ordered and performed load is completed. A load can be ordered without necessarily having been performed. There can be only one such load in the core designated as the Source of Speculation or SoS load. This means that all loads before the SoS load are completed and all loads after it are unordered. Unordered loads that are performed are M-speculative loads.

A read is the coherent request of a load at cacheline granularity. A read is performed when it brings the data in the L1. A store is performed when it makes its value globally visible by writing it in the cache. A store writes the cache when it reaches the head of the store buffer (SB) and has write permission. Request for write permission can occur as early as the store resolves its address. A coherent write request, at cacheline granularity, prefetches the cacheline (if needed) with write permission. If write permission has been lost by the time the store reaches the head of the store buffer, the store requests write permission again and writes the cache before it relinquishes the permission. A coherent write transaction is performed when it gets the data with write permission in the cache. Writes are not bound by the program-order of the stores that initiate them and can be performed in any order.

In one embodiment a load goes into lockdown when it becomes M-speculative, i.e., it is performed out-of-order with respect to older non-performed loads. A load exits lockdown when it becomes ordered. A load can be speculative for other reasons. A load is control-speculative (C-speculative) if it is on a speculative path (i.e., past unresolved branches); and is dependency-speculative (D-speculative) if prior stores have unresolved addresses. If a load is squashed as C-speculative or D-speculative, its lockdown is ended.

Figure 2A:
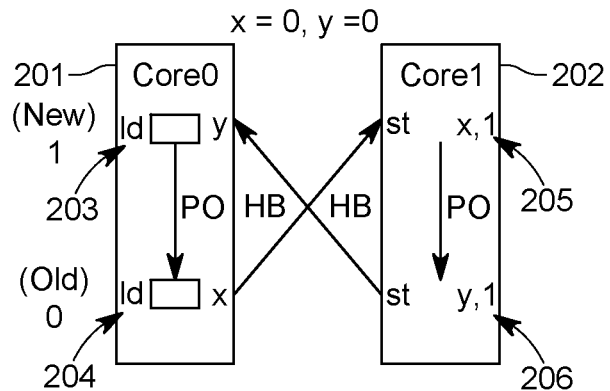
FIGS. 2A and 2B illustrate how the embodiments delay a remote store to guarantee total store order (or weaker) consistency without squashing.
Figure 2B:
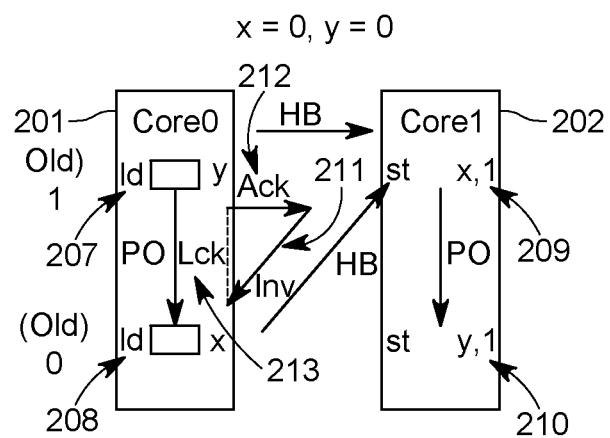

To illustrate the basic mechanisms of the disclosed system and method, the case where out-of-order execution allows the reordering of two loads is described with respect to FIGS. 2A and 2B: i.e., the case where the older (in program order) load cannot issue because it has not resolved its address or issues but misses in the cache, while the younger (in program order) load hits in the cache. The younger load becomes speculative until the time that the older load is performed, i.e., resolves its address, issues, and gets its data. The disclosed system and method is illustrated using the hit-under-miss example.

An invalidation for the address of the younger M-speculative load observes (detects) the reordering. As mentioned above, conventionally, this results in the squash of the load (and all following instructions) and its eventual re-issue, wasting both energy and bandwidth.

FIGS. 2A and 2B illustrate the difference in the ways that the consequences of reordering are addressed in both conventional cache systems (FIG. 2A) and cache systems according to the embodiments described herein. A reordering is observed is when the two reordered loads (203, 204 in the conventional system of FIG. 2A obtain their values in a different order than the memory order the values were written to the respective memory locations by two stores numbered 205 and 206 in FIG. 2A.

In this case, the younger load (Id), i.e., Id x 204, hits in the cache and binds to the old value and the older load, i.e., Id y (203), misses in the cache and sees the new value of y, written by st y 206. This is illegal in TSO.

FIG. 2A shows why this is the case. The program-order (PO) between the loads in Core 0 201 and the program-order between the stores in Core 1 (202) must be respected, yet the values read by the loads imply an interleaving that forms a cycle. In conventional systems like that of FIG. 2A, the Id x 204 is squashed and re-executed forcing it to bind to the new value of x.

By way of contrast consider instead an embodiment according to the present invention as shown in FIG. 2B. Therein, there are once again two loads (Id y 207 and Id x 208) in Core 0 and two stores (st x 209 and st y 210) in Core 0, just as in the case described above with respect to FIG. 2A. In the same manner as load x 204, Id x 208 irrevocably binds to the old value of x due to the reordering. However, unlike the conventional system of FIG. 2A, and in order to maintain TSO, Id y 207 also binds to the old value of y (since if Id y 207 sees the new value of y, written by Core 1 202, TSO is violated).

According to the embodiment of FIG. 2B, instead the necessary condition for Id y 207 to see the new value of y is that st x 209 must be performed first: st x 209 precedes st y 210 in core1 202, therefore st x 209 must be performed in the system (i.e., it must become globally visible) before y gets its new value. These embodiments guarantee that Id y 207 will read y before the store of x is performed and therefore it guarantees that Id y 207 will get the old value of y.

This guarantee can be enforced by, according to some embodiments, the use of certain cache coherence mechanisms 211, 212 and 213. For example, the necessary condition for Id x 208 to read the old value of x is for Core 0 201 to have a cached copy of x created before st x 209. Accordingly, in this embodiment, Core 0 201 sees an invalidation for x 211 before Id y 207 can see the new value of y.

When Core 0 201 gets an invalidation (Inv) for x 211, the disclosed system and method delays the invalidation acknowledgement (Ack) 212, and therefore it delays st x 209 by withholding the write permissions for x, until Id y 207 gets the old value. This is illustrated in FIG. 2B, where the acknowledgment (Ack) 212 to the invalidation (Inv) 211 of st x 209 is delayed with a lockdown mechanism (Lck) 213 until Id y 207 performs.

Alternatively, and according to other embodiments, instead of delaying the acknowledgment Ack 212 to the invalidation in order to delay st x 209, the disclosed system and method keeps negative-acknowledging (NACK) the invalidation until the time Id y 208 gets the old value. Negative-acknowledging the invalidation forces the sender to repeat the invalidation.

Cache coherence protocol correctness does depend on the latency of the response to an invalidation, as it is guaranteed that a response will be eventually returned. The disclosed system and method delays the invalidation response until a load (e.g., Id y) is performed.

Delaying the write of x by withholding the response to its invalidation will delay the write on y even if this write is done by a third core, as long as x and y are updated in a transitive happens-before order dictated by program-order and synchronization-order.

If st x and st y are on different cores and independent, i.e., their happens-before order is established purely by chance and it is not dictated by program-order or synchronization-order, delaying st x has no effect on st y and does not prevent Id y from seeing the new value of y. However, since there is no program-order or synchronization-order to enforce between the stores, the stores can be swapped in memory order. Delaying the invalidation response to st x will move st x after st y in memory order, yielding a legal TSO interleaving in the case where Id y reads the new value of y.

A miss-under-miss scenario where the read requests are reordered in the network, is equivalent to the hit-under-miss scenario. If the younger load, Id x, reads the old value of x, the underlying protocol can ensure that, in that case, Id x gets a cached copy of x (that will be invalidated) before Id y can see the new value of y. In one embodiment this is accomplished by the lockdown mechanism: when a load performs out-of-order with respect to any older load in the same core, it locks down, i.e., it will not acknowledge invalidations until all previous loads perform.

In a further embodiment, in addition to a lockdown mechanism, a store is blocked (not made globally visible) until all existing lockdowns for the store's cacheline address, on all cores, are lifted; and no further writes for the address in question can take place in memory order before the blocked store is allowed to be performed; and loads are never blocked, so that the lockdowns can be lifted to unblock the store.

In one embodiment a new transient directory state blocks a coherent write request from completing until the relevant lockdowns are lifted, yet at the same time, never blocks the loads' read requests from accessing the current value of the data. This new transient coherence state is referred to herein as "WritersBlock". In conventional cache systems, transient directory states for writes block both new reads and new writes. By way of contrast, and according to some embodiments described herein, WritersBlock decouples read blocking from write blocking and enforces only the latter. WritersBlock coherence according to such embodiments extends any invalidation-based, MESI, or MOESI, or MESIF, or MOESIF, etc., directory protocol (e.g., as in GEMS) to support cores that can set lockdowns, while maintaining compatibility for cores that use squash-and-re-execute to enforce TSO (or other weaker memory models) on speculative reordering.

Figure 3A:
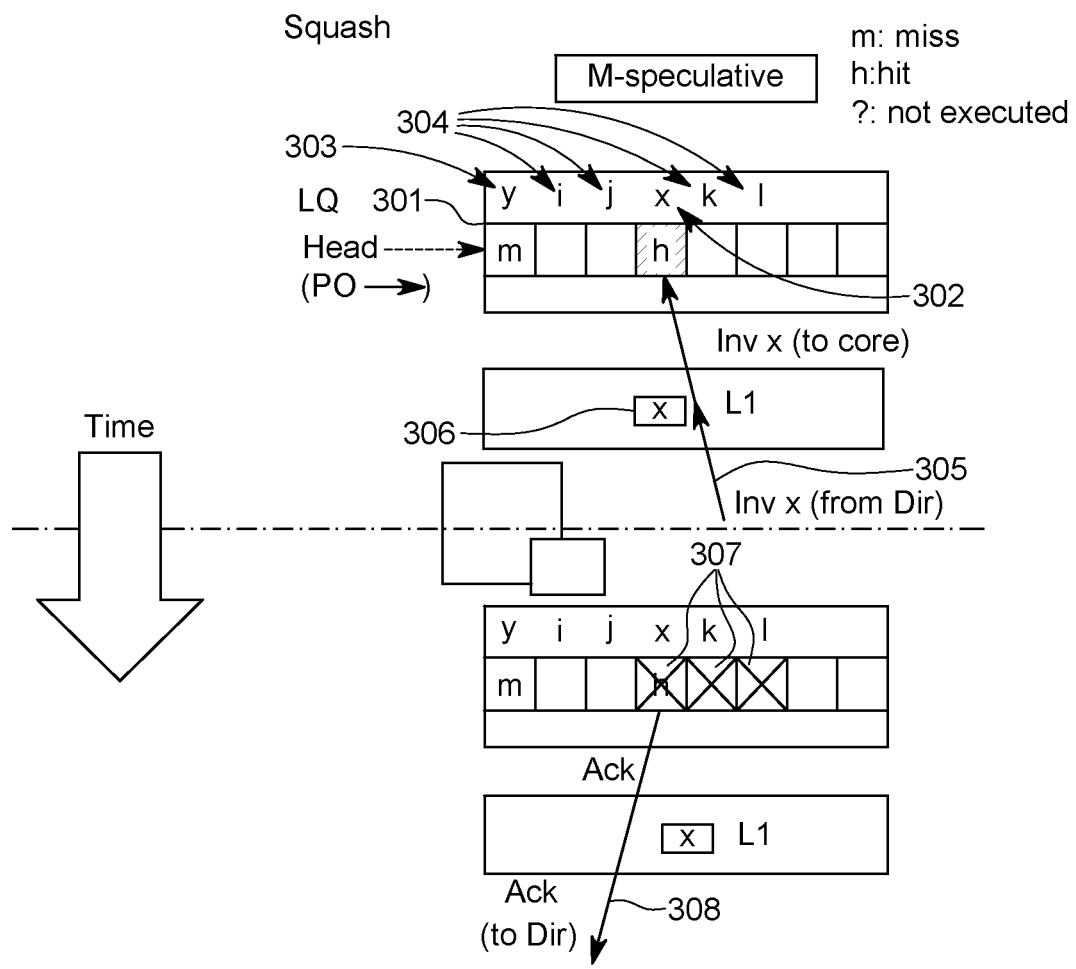
FIGS. 3A and 3B show the lockdown mechanism in the load queue of a core according to an embodiment.
Figure 3B:
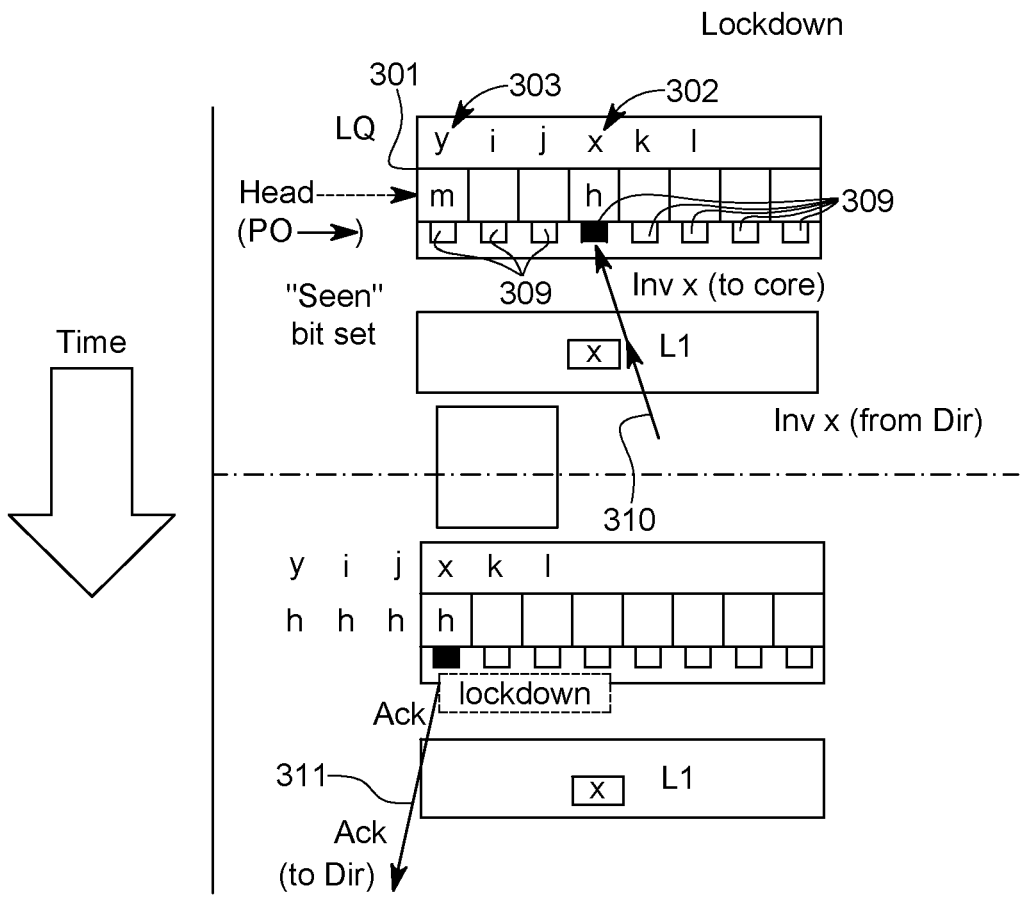

In one embodiment lockdowns are implemented in the load queue (LQ) of a core. FIGS. 3A and 3B contrast the operation of a conventional squash-and-re-execute core, (FIG. 3A) with one having a lockdown mechanism (FIG. 3B) according to an embodiment. The upper portion of each of the FIGS. 3A and 3B show the LQ at two different points in time, as will be described below. The example refers to the Id ra,y and Id rb,x instructions (indicated by the corresponding load address x 302 and y 303 in FIGS. 3A and 3B) with additional loads interspersed in-between (indicated by i, j, k, l). Only the core's LQ 301 is depicted, which load queue keeps loads in program order (PO).

LQ entries are tagged with the load address and show the status of the instruction: i.e., h: hit, m: miss. The speculatively performed load is shaded. Loads exit the head of the LQ (FIFO) at the same time they commit and are removed from the reorder buffer (ROB).

As it is shown in FIG. 3A, an invalidation for address x 305 results in the immediate squash of Id x and all following (younger) loads in the LQ as indicated by the "x"'d out blocks 307 in the lower portion of FIG. 3A, the invalidation of cache line x 306 and the return of the acknowledgment 308.

Compare the results of FIG. 3A with those of FIG. 3B which depicts the lockdown approach. Therein, each LQ entry is augmented with an extra "seen" bit (S) 309. The S bit 309 is set when some other core sees this load execute out of order, i.e., when an invalidation 310 matches the target address of the load while the load is in lockdown. In contrast to the squash-and-re-execute case, loads are not squashed upon invalidation.

In these embodiments, the S bit 309 operates to withhold the Ack 311 for the invalidation until the time the load exits the lockdown mode, i.e., when the process becomes ordered (all the loads that precede the load are performed) or is squashed (if it is C-speculative or D-speculative and there is a misspeculation). At this point, if the S bit 309 is set, the acknowledgement 311 to the invalidation 310 is returned.

There can be as many lockdowns as unordered loads in the LQ 301, irrespective of their target address. If there are multiple M-speculative loads on the same (cacheline) address, they can be all in lockdown. In this case, the S bit 309 is set for the youngest load. If this load is squashed because it is C-speculative or D-speculative, the S bit 309 is transferred to the next youngest load that survives the squash. Only when the youngest load becomes ordered (or is the last one for this cacheline address to be squashed) the invalidation Ack is returned.

In another embodiment lockdowns are implemented directly in the L1 cache memory which is also accessed by invalidations. A load that is performed over older non-performed loads, accesses the L1 and sets its sentinel in the accessed L1 cacheline. The sentinel is a unique identifier that distinguishes the loads that are in the core's instruction window at the same time. The cacheline goes into lockdown mode which means that it is under a speculative read and cannot be invalidated nor evicted. The sentinel can be updated by younger speculative loads, up until the time the cacheline is matched by an invalidation. At this point the sentinel cannot be updated any longer. This prevents a livelock from an endless update of the sentinel.

According to this embodiment, a cacheline in lockdown that receives an invalidation, withholds the Ack to the invalidation until the time that the speculative load that last set the sentinel commits. At that point the load removes the sentinel from the cacheline. Other loads that may have set older sentinels in the cacheline may attempt to remove their sentinel from the cacheline but because the sentinel is different they do not succeed in doing so. If the last (youngest) load that set a sentinel in a cacheline is squashed for other reasons (e.g., because it is D-speculative and violates a dependence, or because it is control-speculative and it is on the wrong path) it removes the sentinel. When a sentinel is removed from a cacheline, any invalidation acknowledgement that was withheld is released.

In another embodiment, lockdowns are implemented in a lockdown table, LDT. If an M-speculative load irrevocably bounds to a value, it exports its lockdown to a small structure next to the L1, called herein the Lockdown Table (LDT). Each committed load corresponds to an entry in the LDT. A small number of lockdowns (e.g., 32) is kept in the LDT and in the rare case this limit is reached, no further irrevocable bindings of M-speculative loads can occur. As in the embodiment of a lockdown LQ, multiple lockdowns in the LDT for the same cacheline address are allowed and an Ack is returned (if there was an invalidation) only when the last lockdown in the LDT for this address is lifted. Similarly, the LDT allows multiple lockdowns for the same cache line address (one per load). On invalidation, the S bit is set for all LDT entries of the same address, but the Ack is sent only when the last lockdown in the LDT for this address is released. Only when the youngest M-speculative load for a given address becomes ordered is the invalidation Ack is returned.

Incoming invalidations search the LDT associatively using the cacheline address and set the "seen" S bit of the matching LDT entry. Correct operation is to release each lockdown and return the invalidation Ack (if the S bit is set) when the corresponding M-speculative load would have become ordered. The responsibility of releasing its lockdown can be assigned to its immediate older non-performed load, (i.e., the first non-performed load towards the SoS load). If that older load also commits while being M-speculative, it passes all the lockdowns for which it is responsible (including its own) to the next non-performed load, and so on, until the SoS load is reached. When the SoS load is performed it lifts all the lockdowns it has been assigned. The lockdowns are efficiently encoded in the LQ entries as a bitmap index to the LDT entries.

Figure 4:
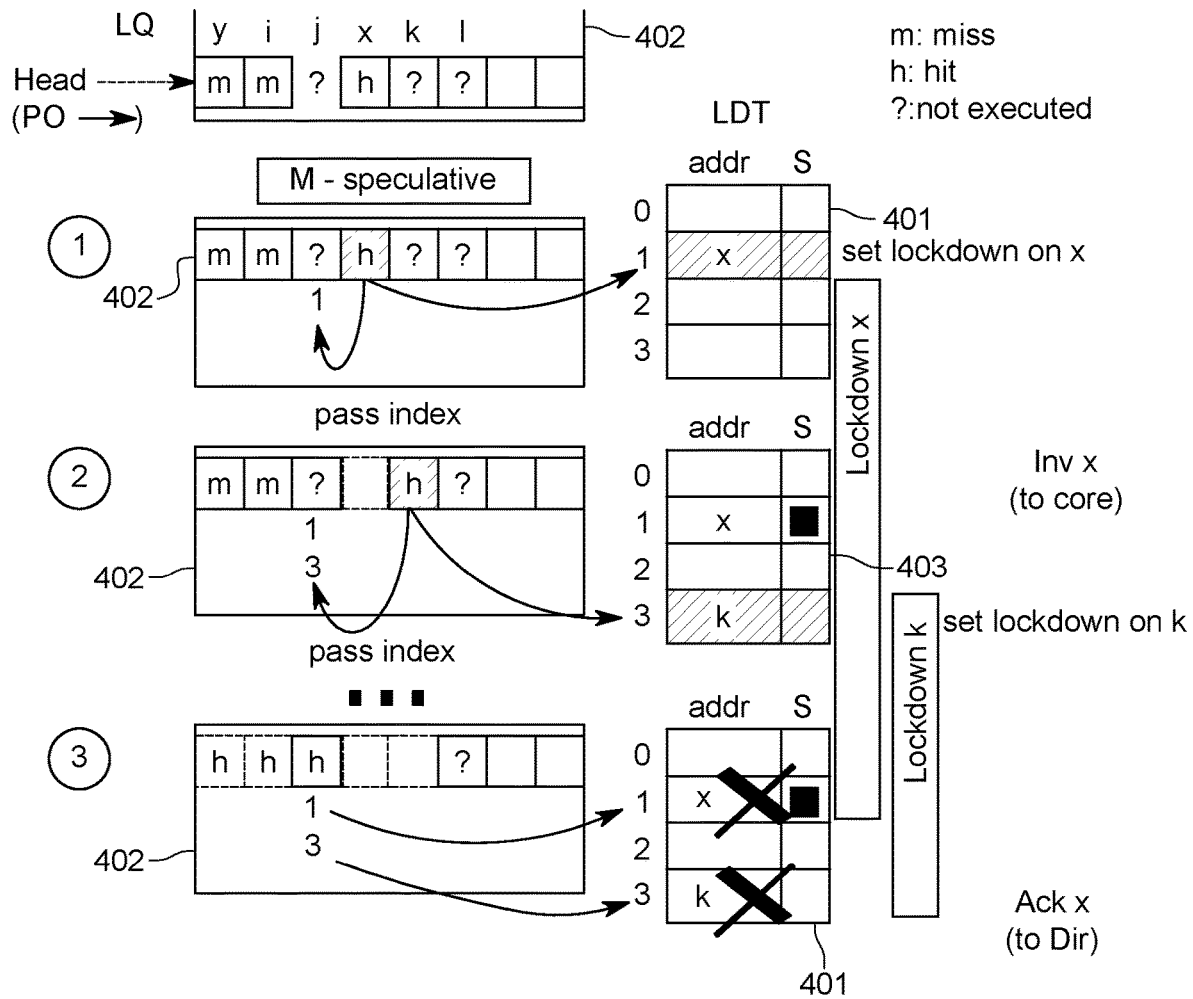
FIG. 4 illustrates lockdowns in a lockdown table and operation with a collapsible load queue according to an embodiment.

The LDT endows a collapsible LQ where irrevocably bound M-speculative loads can be removed from the LQ, with the lockdown functionality of a non-collapsible LQ. FIG. 4 shows the operation of the LDT 401 in relation to a collapsible LQ 402 according to an embodiment, as their contents change over a series of three steps (circled 1, 2 and 3). Each LDT entry contains the address of a lockdown, and the corresponding "seen" bit, S. When a load commits out-of-order it is removed from the LQ 402, for example, Id x in step 1. At this point the lockdown is transferred to the LDT 401 by allocating a new entry, e.g., entry LDT[1] in FIG. 4.

The responsibility to lift the lockdown of Id x is passed to the first available older load in the LQ 402, Id j, by assigning it the index of entry LDT[1] in the LDT 401. (Although indices are encoded in a bitmap, in FIG. 4 they are shown as individual entities for clarity.) More than one index can pile up on a load. For example, in step 2, Id k commits, sets its lockdown in entry LDT[3], and passes the lockdown index to the LQ entry of Id j. Any load that is removed from the LQ 402 transfers its set of indices (the bitmap that also encodes its own index) to the first available LQ entry on its left.

Between steps 2 and 3 in FIG. 4, Id j "guards" two more lockdowns (1 and 3). When it becomes performed and ordered in step 3, it lifts its lockdown if it had set one and releases all the lockdowns in its set of indices. When lockdowns are lifted, Acks are sent for the invalidations that may have arrived in the interim. This is handled by the "seen" bit in each lockdown entry in LDT 401. Ld x, which may have been committed out-of-order, is "seen" by an invalidation that matched the lockdown LDT[1] in step 2, and set the "seen" bit. When the lockdown is lifted in step 3, the invalidation is acknowledged.

In one embodiment a new directory state: i) puts the directory entry in a state that will hold a write in waiting until all the lockdowns for this write are lifted; li) blocks all new writes; iii) allows new reads (e.g., initiated by loads) that reach the directory to see the current value of the data, i.e., the last value before the pending write. This new directory state is referred to herein as "WritersBlock" and is described below with respect to FIG. 5.

Figure 5A:
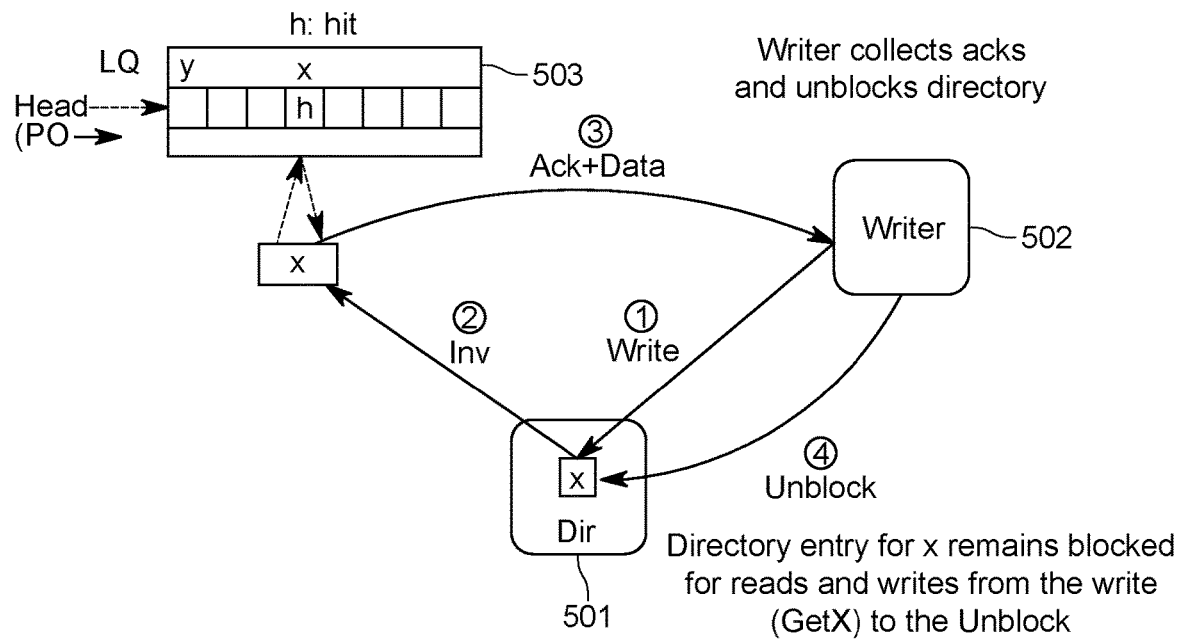
FIGS. 5A and 5B illustrate a write operation that encounters a lockdown in a core according to an embodiment.
Figure 5B:
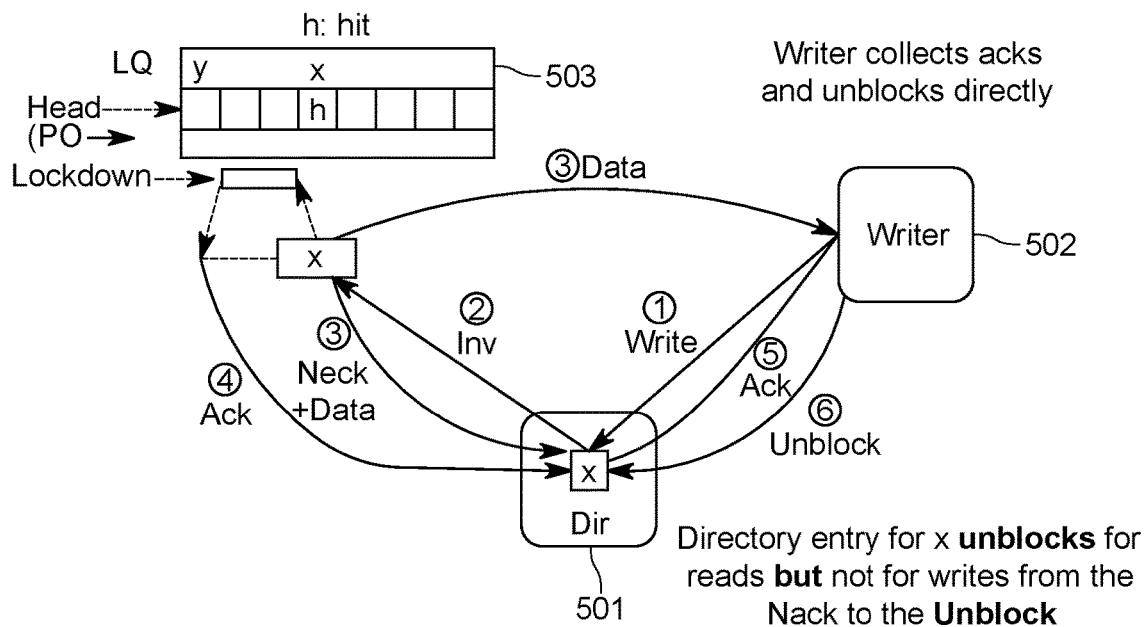

FIGS. 5A and 5B illustrates write in the embodiments which provide for the WritersBlock directory state using, simply as an example, a typical MESI directory protocol (thus other directory protocols. FIGS. 5A and 5B show the directory 501, the writer 502, and one sharer (only the LQ 503 of the sharer is shown). There may be more sharers (not shown) or just the one shown in exclusive or modified state. FIG. 5A shows the base protocol case, i.e., where a write does not hit a lockdown, while FIG. 5B shows the lockdown case where the sharer sets a lockdown on the address.

In FIG. 5A, upon a write miss the writer 502 sends a write request to the directory 501 (FIG. 5A, step 1). The directory 501 blocks reads and writes to the target line until the write transaction completes. The directory 501 sends invalidations (Inv) to the sharers (FIG. 5A, step 2). Invalidation acknowledgments (Ack) are returned to the writer 502 (FIG. 5A, step 3). The writer 502 gets the data either from the directory 502 which has an up-to-date copy) or from the single exclusive/modified copy. In this case, the exclusive/modified copy sends the invalidation acknowledgment and the data in the same message (Ack+Data). When the writer 502 has the data and all the acknowledgments (all sharers have been invalidated) it unblocks the directory 501 (Unblock).

FIG. 5B illustrates the case using the WritersBlock directory state. Note that the common case of a write that does not hit a lockdown remains unchanged from the base protocol illustrated in FIG. 5A and described above. However, an invalidation that hits a lockdown sends a Nack to the directory 501 (FIG. 5B, step 3). It is this Nack that puts the directory entry into the WritersBlock state which blocks all writes but allows reads to proceed.

The shared level cache (e.g., lower level cache (LLC)) may have stale data when there is a single exclusive or modified copy that is invalidated. In this case, the data are simultaneously sent to the shared level along with the Nack (Nack+Data) and to the new writer 502 (Data), as depicted in FIG. 5B, step 3. Thus, the readers are provided with a place to access to the data, as the exclusive copy is no longer accessible via the directory 501—it has been invalidated—and the new writer 502 is not visible yet.

When a lockdown is lifted, an Ack must be returned to the writer 502. Lockdowns are not required to retain the identity of the writer 502 and there can be only one S bit to indicate that an invalidation has occurred but not who is invalidating. The Ack is redirected to the writer 502 via the directory entry where the writer's identity is known (FIG. 5B, steps 4 and 5). When the writer 502 has the data and all of the acknowledgments it unblocks the directory 501.

In one embodiment a lockdown returns Nack to the invalidation, putting the directory entry in the WritersBlock state that allows reads (of the latest "old" data) but blocks all writes. The current writer 502 awaits the Ack to complete its transaction. In one embodiment the Ack of the invalidation redirects through the directory 501 to the writer 502. In one embodiment data are sent to both to the directory 501 and to the writer 502 if the invalidated cache line was in exclusive state.

In one embodiment there are no new lockdowns after invalidation. A write can only be blocked by a number of loads that are in lockdown at the time of invalidation. New loads in the invalidated cores and new loads in new reading cores are not allowed to block anew an already blocked write.

The common case of a read that finds a directory entry not in the WritersBlock state remains unchanged from a read of a base directory protocol. In the embodiments described herein, base protocol reads are assumed to be 3-hop transactions (e.g., Read Shared (GetS) request, Data reply, Unblock message), either finding the data in the shared level cache, or redirecting via the directory to the cache that has the exclusive copy. The embodiments can be adjusted to other types of base protocol reads.

Consider now, however, the case of a read which hits a directory entry having the "WritersBlock" state. In one embodiment the directory entry in the WritersBlock state serves an uncacheable copy of the data to a read request, without registering the reader in the sharing list; i.e., the cache memory system serves an uncacheable tear-off copy of the data to the read request. In this context, the term "tear-off" refers to the fact that the copy is not registered in the coherence directory. In this way, there are no new sharers to invalidate.

Figure 6:
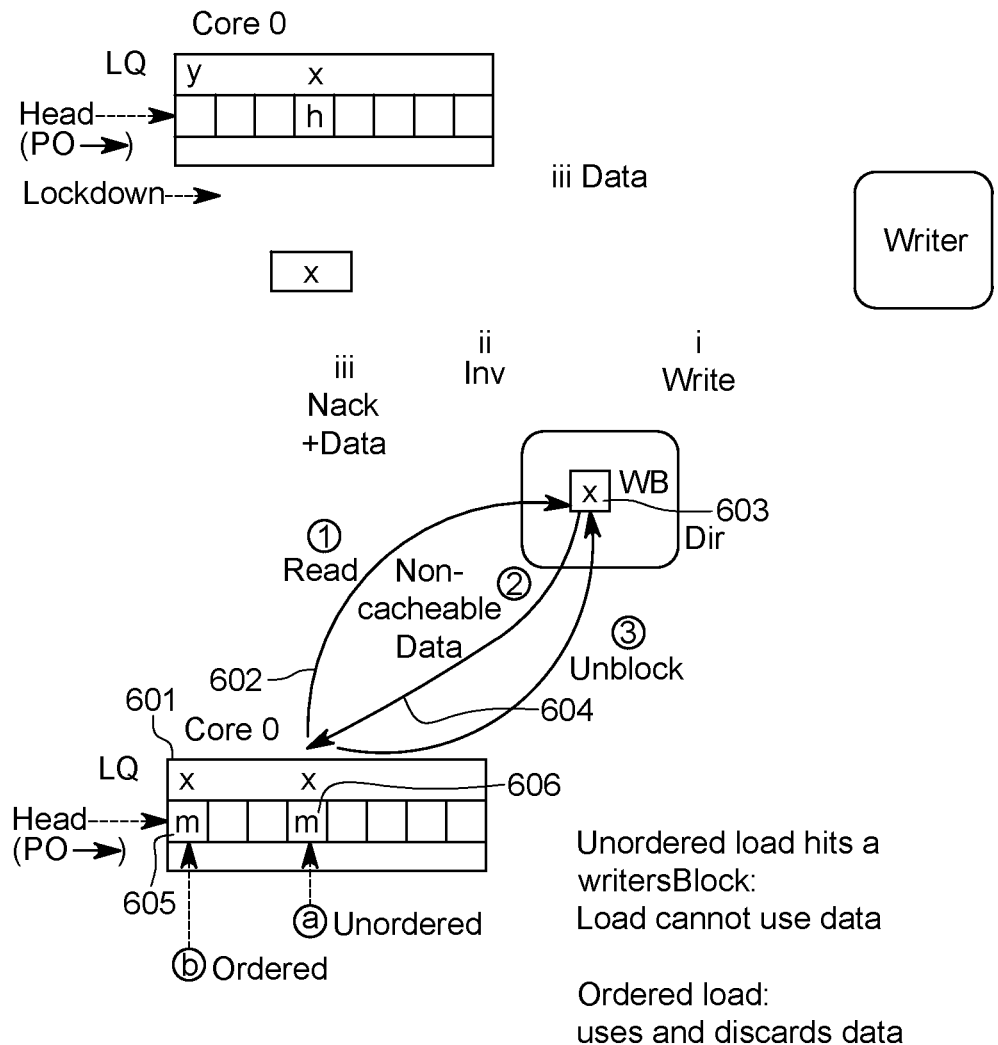
FIG. 6 illustrates a read operation that encounters a "WritersBlock" directory entry according to an embodiment.

FIG. 6 depicts the uncacheable tear-off protocol for reads to directory entries having the WritersBlock state according to an embodiment. Therein, Core 1 601 issues a read request 602 for a load that misses. The directory entry 603, in the WritersBlock state, replies with an uncacheable copy of the data 604 that can be used at most once. Since the copy is not cached, the directory entry does not track it. It is always correct for the ordered SoS load Id x 605 marked as "a" in FIG. 6 to be performed immediately using the uncacheable tear-off copy. An M-speculative load, Id x 606, marked as "b" in FIG. 6 cannot be performed by using the uncacheable tear-off copy and upon receiving an uncacheable copy, this load repeats its request anew. In one embodiment the load request is only repeated when the Id x 606 becomes ordered, i.e., when it becomes the SoS load.

In one embodiment, a core refrains from issuing new (unordered) loads for any address for which there is already a lockdown and an invalidation has been received by the core.

In one embodiment directory entries in the WritersBlock state cannot be evicted and instead of evicting a WritersBlock entry, the conflicting request obtains an uncacheable tear-off copy of the data and performs without needing a directory entry.

In one embodiment eviction is performed on the side, in an eviction buffer (e.g., MSHRs). This allows a read request to immediately claim a directory entry and obtain a cacheable copy of the data. The WritersBlock entry under eviction is put in the eviction buffer until it is safe to discard, after the blocked write completes. Only when the eviction buffer is full, and the read cannot allocate a directory entry, the read turns into an uncacheable transaction.

In one embodiment a SoS load initiates a read request on a new MSHR to bypass a potentially blocked write.

In one embodiment a hint is returned to any write that enters or encounters a WritersBlock. A SoS load initially piggybacks on the MHSR of a write and waits. If and when it is determined that the write has blocked, a new read is launched on a new MSHR. This new read receives an uncacheable tear-off copy.

In one embodiment a new MSHR is allocated for the SoS load, and resource partitioning at all levels of the hierarchy: There is at least one MHSR always reserved for SoS loads; stores or evictions cannot consume all MHSRs.

Deadlocks could arise because of resource conflicts or resource exhaustion: i.e., when the read of a SoS load conflicts with a blocked write on the same MHSR, or when it conflicts with a directory entry in WritersBlock.

In one embodiment SoS loads cannot be blocked by writes, and consequently by stores, directly or indirectly, anywhere in the memory system and are guaranteed to be performed. Lockdown loads are guaranteed to become ordered.

According to some embodiments, a store can only be blocked via its write request by the lockdown loads of the cores it invalidates. Their number is fixed, no new lockdowns for an address in WritersBlock are allowed. Since lockdown loads are guaranteed to become ordered, writes are also guaranteed to be performed.

Stores are guaranteed to be performed even though they must be performed in program order (i.e., when they reach the head of the FIFO store buffer) but can send their write request in any order (e.g., to prefetch write-permission). The reason is that it is the completion of the write transaction that lifts the WritersBlock—not the store being performed. These two events are decoupled: A store may be performed only when it reaches the head of the FIFO store buffer (and still has write permission), but its write may be sent earlier and be performed without any ordering restriction with respect to other writes in the same core. This ensures that stores from different store buffers do not deadlock when sending write prefetch requests.

An atomic RMW instruction is an atomic load-store pair. In TSO, the load of an atomic instruction is not allowed to bypass stores in the store buffer. This would violate either the store→store order or the atomicity of the instruction. Thus, the store buffer needs to be drained for the atomic instruction to execute. In WritersBlock coherence, however, in order for the store buffer to drain, it may be necessary for the load of the atomic data to bypass blocked stores in the store buffer. Furthermore, even if the store buffer drains without a problem, the load of an atomic instruction behaves as a store. In fact, in many implementations the load issues a write transaction to obtain write permission. This means that the load itself can block in WritersBlock.

In one embodiment the load of an atomic RMW can never be a source-of-speculation (SoS) load. This means that no load following an atomic instruction in the ROB can go into lockdown mode.

In one embodiment atomic instructions default to the behavior of the baseline core architecture: If the underlying core supports squash-and-re-execute, loads following an atomic instruction can issue before the atomic instruction executes, but may get squashed. If the underlying core does not support squash-and-re-execute, loads cannot issue until the atomic instruction executes. In this case, however, prefetches can be issued instead and loads can use the prefetched values only after the atomic instruction is performed.

Evictions occur when data is removed from the cache and can be either silent or non-silent. A silent eviction is when a cache line is evicted from the cache and the directory is not notified about this eviction, i.e., it still registers the cache line as a sharer. A non-silent eviction is when the directory is informed about the eviction.

Conventionally, non-silent evictions that remove the evicted line from the directory entry sharing list must cause a squash of M-speculative loads and all instructions that follow. The reason for this is that if a line is evicted, it will not be notified if it is written: the directory will not send an invalidation to a non-sharer. This can lead to a TSO violation. Conservatively, in conventional cache memory systems, a non-silent eviction squashes M-speculative loads in the off-chance that a write would occur in the reordering window.

Silent evictions that do not remove the evicted line from the directory's sharing list do not query the LQ, minimizing squashes. The downside, in this case, is that there may be invalidations that do not find a cache line in the L1—not possible with non-silent evictions—which also must query the LQ.

In one embodiment silent evictions in the baseline protocol remain silent.

In one embodiment non-silent evictions in the baseline that do not cause a squash to remain non-silent.

In one embodiment non-silent evictions in the baseline that cause a squash, i.e., under a lockdown in our approach, become silent instead of squashing. This guarantees that a write during the reordering window will observe the lockdown and block accordingly.

In one embodiment evictions are not allowed for L1 cachelines in lockdown. In such cases, a conflict with a lockdown cacheline, turns into a non-cacheable access.

Areas of application of the disclosed system and method include, but are not limited to:

1. in-order cores that continue executing and issuing memory accesses after a miss without providing the corresponding speculation depth; in prior art, this necessitates a relaxed memory model weaker than TSO that allows load-load reordering;

2. execute-ahead approaches such as checkpoint-based processors, or cores that squash-and-re-execute on conflicts, or cores that lack sufficient speculation depth for reordering.

3. accelerators and decoupled access-execute architectures, that need to commit loads out-of-order but cannot easily rollback and re-execute on conflicts;

4. Software (compiler) approaches that rely on the compiler to reorder loads and provide useful work under a miss but would be unrealistic to checkpoint and rollback in software; and 5. out-of-order cores with non-speculative out-of-order commit.

The foregoing embodiments describe, among other things, systems and methods that preserve TSO (or other weaker memory models), without squashing a reordered younger load upon receiving an invalidation that matches its address. Instead these embodiments do not return an acknowledgment until the time that the older load is performed. An example of a cache memory system which can be used to implement these embodiments is provided as FIG. 1.

Therein, the system includes multiple processor cores 101, 105 and a store buffer 102 associated with and operatively coupled to each core 101, 105 for placing store instructions when they are committed and before they are performed in the memory system. The system in FIG. 1 also includes at least one local cache memory 103 associated with and operatively coupled to each core 101, 105 for storing one or more cache lines accessible only by the associated core. The system further includes a shared memory 104, the shared memory being operatively coupled to the local cache memories 103 and accessible by the cores 101, 105, the shared memory 104) being capable of storing a plurality of cache lines or memory blocks; and a coherence mechanism to keep processor core and shared memory coherent. The core 101 prevents a store in the store buffer of another core 106 from being performed in the memory system, until a condition is met which enables reordered instructions to validly execute.

The embodiments can also be characterized as methods. For example, as shown in FIG. 7 and in accordance with an embodiment, a method for maintaining validity of a memory model in a multiple core computer system includes the step 700 of preventing, by a first core, a store in a store buffer of another core from being performed in a memory system, until a condition is met which enables reordered instructions to validly execute.

The disclosed embodiments describe, for example, systems and methods associated with various cache memory systems. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
   multiple processor cores;
   a store buffer associated with and operatively coupled to each core for placing store instructions when they are committed and before they are performed in a memory system;
   at least one local cache memory associated with and operatively coupled to each core for storing one or more cache lines accessible only by an associated core;
   a shared memory, the shared memory being operatively coupled to the local cache memories and accessible by the multiple processor cores, the shared memory being capable of storing a plurality of cache lines or memory blocks; and
   a coherence mechanism to keep the multiple processor cores and the shared memory coherent;
   wherein a first core uses the coherence mechanism to prevent a store in the store buffer of another core from being performed in the memory system without squashing the store, until a condition is met which enables reordered instructions to validly execute.

2. The computer system of claim 1 wherein the first core prevents the store in the store buffer of the another core from being performed in the memory system until at least one load instruction is performed in the first core.

3. The computer system of claim 2 wherein a load instruction that performs out-of-order with respect to older, in program order, load instructions in a same core, prevents a store, to a same cache line address as the load in the store buffer of another core from being performed in the memory system, until at least a time when at least one older load, in program order, in the first core is performed.

4. The computer system of claim 3 wherein the load instruction that performs out-of-order with respect to older, in program order, load instructions in the same core, prevents the store, to the same cache line address as the load, in the store buffer of another core from being performed, by withholding an acknowledgment to invalidation that is sent when said store attempts to be performed in the memory system, and returning said acknowledgement after at least one older load, in program order, in the first core is performed.

5. The computer system of claim 4 wherein load queue entries are augmented with an S ("Seen") bit and wherein the S bit of a load queue entry is set if a load in said entry performed out of order with respect to older, in program order, loads in the same core, and a load queue entry is matched by an invalidation to the same cache line address, and the load is the youngest, in program order, load on the said cache line address; and wherein a load queue entry with a set S bit returns the acknowledgment to said invalidation when at least one older load, in program order, than the load of said load queue entry, is performed.

6. The computer system of claim 5 wherein a separate table keeps a correspondence of S ("Seen") bits and loads that perform out of order with respect to older, in program order, loads in the same core.

7. A method for maintaining validity of a memory model in a multiple core computer system, the method comprising:
   preventing, by a first core, a store in a store buffer of another core from being performed in a memory system without squashing the store, until a condition is met which enables reordered instructions to validly execute,
   wherein the preventing comprises using a coherence mechanism.

8. The method of claim 7 wherein the first core prevents a store in the store buffer of the another core from being performed in the memory system until at least one load instruction is performed in the first core.

9. The method of claim 8, wherein a load instruction that performs out-of-order with respect to older, in program order, load instructions in the same core, prevents a store, to a same cache line address as the load instruction in the store buffer of another core from being performed in the memory system, until at least a time when at least one older load, in program order, in the first core is performed.

10. The method of claim 9, wherein the step of preventing the store further comprises:
    withholding an acknowledgment to an invalidation that is sent when said store attempts to be performed in the memory system, and
    returning said acknowledgement after at least one older load, in program order, in the first core is performed.

11. The method of claim 10, wherein load queue entries are augmented with an S ("Seen") bit and wherein the S bit of a load queue entry is set if the load in said entry performed out of order with respect to older, in program order, loads in the same core, and the load queue entry is matched by an invalidation to the same cache line address, and the load is the youngest, in program order, load on the said cache line address; and wherein a load queue entry with a set S bit returns the acknowledgment to said invalidation when at least one older load, in program order, than the load of said load queue entry, is performed.

12. The method of claim 11, wherein a separate table keeps a correspondence of S ("Seen") bits and loads that perform out of order with respect to older, in program order, loads in the same core.

13. The computer system of claim 1, wherein the coherence mechanism comprises one or both of delaying acknowledgement of an invalidation and repeatedly negative-acknowledging the invalidation.

14. The method of claim 1, wherein the coherence mechanism comprises one or both of delaying acknowledgement of an invalidation and repeatedly negative-acknowledging the invalidation.

* * * * *